Patented Apr. 22, 1941

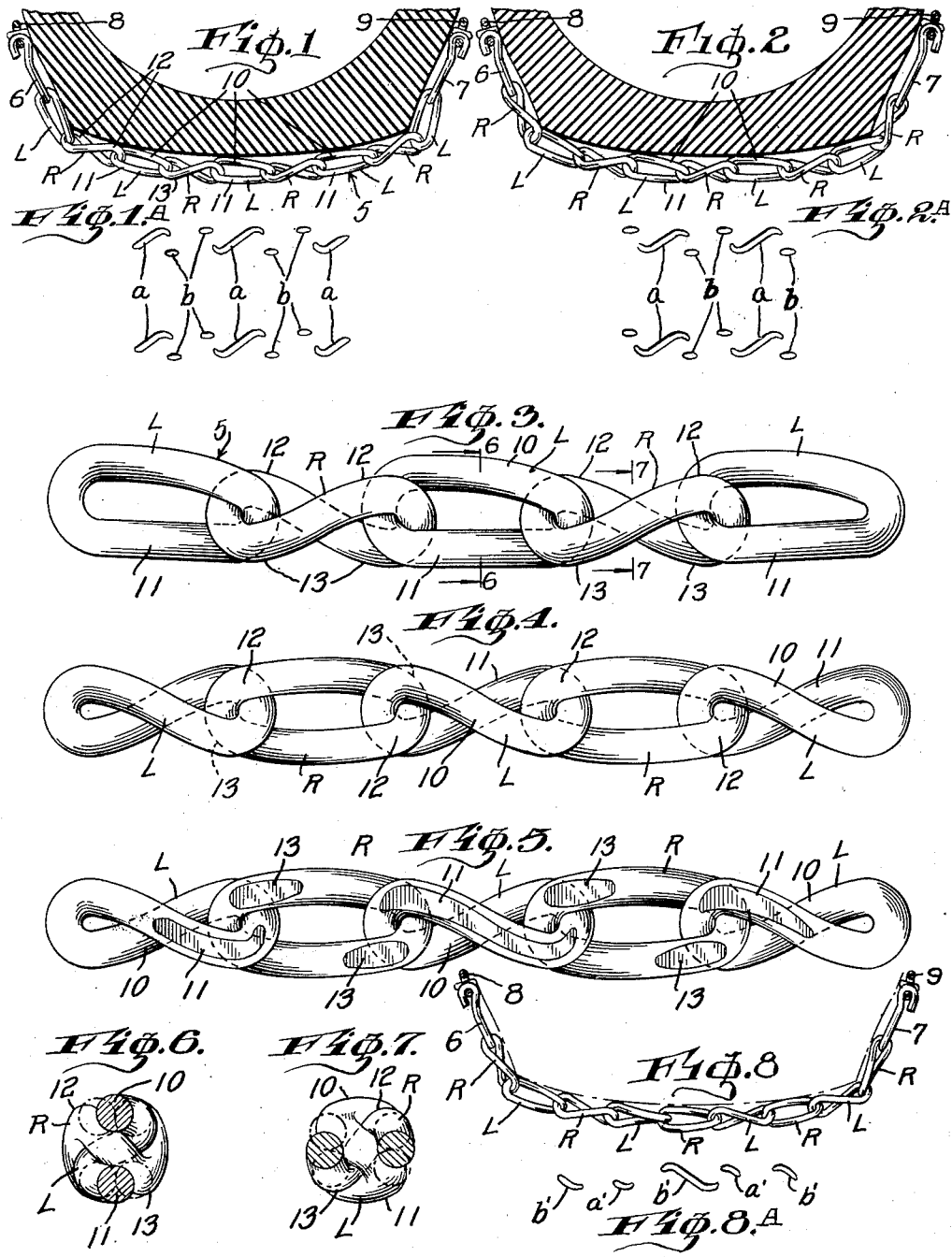

2,238,883

UNITED STATES PATENT OFFICE 2,238,883

TIRE CHAIN

Herbert C. Hegelheimer, Niagara Falls, Ontario, Canada, assignor to American Chain & Cable Company, Inc., New York, N. Y., a corporation of New York Application August 2, 1938, Serial No. 222,578

4 Claims. (Cl. 152—243)

This invention relates to tire chains and especially to cross chains for providing traction and preventing slipping and sidewise skidding.

In the conventional type of chain comprising cross chains secured to side chains or secured directly to the wheel, for example, as emergency chains, the cross chains consist of helically twisted links, twisted in the same sense, and interlocking with each other in such a manner that each link is locked against rotation with respect to an adjacent link in one direction but free to rotate and thread into such adjacent link when rolled in the opposite direction. The ends of these cross chains are usually secured by means of hook links to side chains in such a manner that the hook link and side chain on one side of the tire prevent rolling of the cross chain in one direction as in forward traction and the hook link and cross chain on the other side of the tire prevent rolling of the cross chain in the opposite direction under traction in the other direction. Obviously in these constructions the entire rolling force applied to all of the links under the tread will be transferred to one hook link. In these constructions the twisted links which are generally referred to as curb links are provided each with a pair of tire engaging lobes and a pair of ground engaging lobes and oppositely inclined side strands, the ground engaging lobes receiving all the wear incident to service. These ground engaging lobes extend generally in the same direction so that all of the ground engaging lobes of the links of the same cross chain and also of adjacent cross chains of the same chain, are most effective in one direction and least effective in another direction and the ground engaging lobes of the cross chains for the tire on one side of the vehicle are most and least effective in the same directions as the cross chains for the tire on the opposite side of the vehicle.

One of the objects of my invention is the provision of an improved cross chain consisting of links of opposite twists so related and constructed as to maintain the advantages, and at the same time, avoid the disadvantages of the conventional cross chain consisting of curb links of the same twist.

Another object of my invention is the provision of a cross chain consisting of curb links so formed and related as to present a longer wearing surface to the road and therefore last longer in service than the curb link of the conventional cross chain.

Another object of my invention is the provision of cross chains which may be so related in a chain that the combined effect of adjacent cross chains will be substantially the same regardless of the direction of the tendency to skid.

A further object of my invention is the provision of cross chains for tires on opposite sides of a vehicle so related that the combined effect of the cross chains on opposite tires will be substantially the same regardless of the direction of the tendency to skid.

Still another object of my invention is the provision of a cross chain consisting of twisted links so constructed and related as to freely rotate relatively to each other in limited amounts in either direction without threading or intertwining.

Other objects of the invention will appear from the following description taken in connection with the drawing in which—

Fig. 1 is a cross section of a tire showing a cross chain embodying my improvement supported thereon in engagement with the road;

Fig. 1A shows the track made by the chain shown in Fig. 1;

Fig. 2 is a view similar to Fig. 1 showing another cross chain made in accordance with my invention;

Fig. 2A shows the track made by the chain shown in Fig. 2;

Fig. 3 is a side elevation of a section of the cross chain shown in Fig. 1;

Fig. 4 is a top plan view of the section of cross chain shown in Fig. 3;

Fig. 5 is a bottom plan view of the section of cross chain shown in Figs. 3 and 4 after it has been used;

Fig. 6 is a cross section on the line 6—6 of Fig. 3;

Fig. 7 is a cross section on the line 7—7 of Fig. 3;

Fig. 8 shows the cross chain of Fig. 2 with its right end rotated counter-clockwise before it is connected to the side chain; and Fig. 8A shows the track made by the chain shown in Fig. 8.

In Fig. 1, I have illustrated a cross chain 5 comprising nine links, this number of links having been chosen merely for the purpose of describing my invention. The end links of the cross chain are connected by hook links 6 and 7 to side chains 8 and 9 as in conventional constructions. It is obvious, of course, that these cross chains may be secured on the tire in any desired manner.

In the construction shown in Fig. 1, the alternate links of the cross chain are designated R and L, the links designated R being herein referred to as right-hand twisted links, as they may be made by holding the left-hand end of the link stationary and twisting the right-hand end of the link away from the operator. The links designated L are herein referred to as left-hand twisted links as they may be made by holding the left-hand end of the link stationary and twisting the right-hand end of the link toward the operator.

As shown in Fig. 1, the right-hand end link and the left-hand end link of the cross chain are both left-hand twisted links as are also the third links from the ends of the cross chain and the center link. The remaining links are right-hand twisted links. All of the left-hand twisted links L have one side strand 10 bearing against the tire and the other side strand 11 bearing on the road. As shown in Fig. 1A the side strands 11 leave a track on the road of the shape and direction indicated at a. The links R have tire engaging lobes 12 and road engaging lobes 13 which are in contact with the road or at least brought into contact with the road during operation which will leave tracks in the road indicated at b. It is to be noted that the tracks or impressions a and b, as appear more clearly from the slightly worn cross chain in Fig. 5, are angularly related to each other so that any tendency to skid in the direction of the length of impressions a will be resisted by the road engaging lobes 13 of the right-hand twisted links, and vice versa, any tendency to skid in the direction of the length of the impressions b will be opposed by the side strands 11 of the left-hand twisted links L. As will be seen from the disclosure a great amount of the wear will be taken by the road engaging side strands 11 of the left-hand twisted links L so that a great amount of material is presented for wear as compared with the material presented for wear in the ordinary conventional twisted curb chains which engage the road only at their road engaging lobes. It is obvious, of course, that the number of links employed in each cross chain may be varied.

In Fig. 2 I have shown a cross chain made of the same number of links as that shown in Fig. 1, but I have used a cross chain which has right-hand twisted links R at its ends and in which the third links from the ends of the cross chain and the center link are all right-hand twisted links R alternating with left-hand twisted links L. When such a cross chain of links of the same size as those shown in Fig. 1 are employed and are mounted in the same manner on the tire but with the right-hand end link R and hook link 7 rotated clockwise approximately 90°, they produce the track indicated in Fig. 2A, the left-hand links L producing the impressions indicated at a and the right-hand links producing the impressions indicated at b. It will be noticed from Figs. 1 and 1A and Figs. 2 and 2A that the links which engage the road edgewise, that is with their side strands 11, may engage either directly under the center of the tread or laterally thereof.

In Fig. 8A I have shown the impressions a' and b' produced by the cross chain of Fig. 2 with the right hand end link R and hook link 7 rotated counter-clockwise approximately 90° before connection with the side chain as shown in Fig. 8. It will be readily apparent by comparing Figs. 1A and 8A that the longer impressions a' and b' extend at an angle with respect to each other. By connecting adjacent cross chains to the side chains as shown respectively in Figs. 1 and 8 and especially in constructions in which two of these chains are placed in closely spaced relation there will be a counter-balance effect produced not only by the links of the individual chains which produce the impressions a and b and a' and b' but also by the links of the chains which produce respectively the impressions a and b' and the impressions b and a'. It is obvious also that if all of the cross chains for a tire on one side of the vehicle are constructed as shown in Fig. 1 and all those for a tire chain for the tire on the opposite side of the vehicle are constructed as in Fig. 8 that the combined effect of the two chains will be such as to provide for substantial equal resistance against skidding in any direction.

It is clear from an inspection of Figs. 1A and 8A that this construction provides for increased efficiency during traction in either direction and against skidding in any direction. It will also be noticed as indicated by the broken and dotted lines in Figs. 6 and 7 that any link in the series of links of the cross chain is free to rotate in either direction with respect to either adjacent link whereby it may adjust itself to the road and tire and rotate limited amounts without transmitting the force tending to roll such link to the adjacent link and to the link hook at the end of the cross chain and to the corresponding side chain. As the adjacent links are of opposite twists, they will not readily intertwine and will not shorten the cross chain as is the case with the conventional cross chain of curb links of the same twist. The side strands of every second link of the series which are presented to the road project a greater distance from the tread of the tire than do the lobes of the links in cross chains of the conventional construction and also a greater distance than do the road engaging lobes of the intermediate links of my improved construction, thus providing very effective traction and anti-skid effects. Each link may be twisted 85° to 90°, more or less as desired.

My improved chain consists of the conventional form of curb link which in the conventional construction in which all of the links of the cross chain are of the same twist may be described as an open link comprising oppositely inclined side strands connected by arcuate end portions which provide a pair of tire engaging lobes and a pair of road engaging lobes. These links are usually wider than high and when connected form a cross chain engaging the surface of the tire flatwise so that each link has its tire engaging lobes in contact with the tire and its ground engaging lobes in contact with the road or at least projecting in a direction toward the road. In my improved cross chain construction adjacent links are of opposite twists so that every second link is of the same twist and the remaining interconnecting links are of opposite twist. These links are shown as being wider than high and when mounted on the tire every second link presents one of its side strands for engagement with the road and has its other side strand engaging the tire, while the remaining connecting links are arranged flatwise of the tire and road so that their tire engaging lobes and ground engaging lobes may be moved into engagement with the tire and the road during service. As the links L are higher as viewed in Fig. 3 than the links R, it is obvious that most of the wear is taken by the road engaging side strands 11 of the links L, Fig. 5, and that the road engaging lobes 13 of the links R are more or less protected against wear.

While I have disclosed one form of my invention and one manner in which cross chains embodying my invention may be supported on a tire, it is to be understood that the invention may be applied on tires or the like in different relations to the tire and by other means and may be used for other purposes, and that I reserve the right to make all such changes as fall within the principles of my invention and the scope of the appended claims.

I claim:

1. A chain comprising a series of interconnected curb links, adjacent links of which are of opposite twist.

2. A tire chain comprising a series of interconnected curb links twisted approximately 90° and of greater width than height, adjacent links being of opposite twist.

3. An anti-skid cross chain comprising a series of interconnected twisted links, adjacent links of which are twisted in opposite directions, and means for supporting the cross chain on a tire so that the links of one twist will be presented edgewise to the road and the links of the other twist flatwise to the road.

4. An anti-skid cross chain comprising a series of twisted links, adjacent links of which are twisted in opposite directions, each link comprising oppositely inclined side strands and a pair of upwardly projecting and a pair of downwardly projecting lobes, and means for mounting said cross chain on a tire with one of the side strands of the links of one twist engaging the tire and the other side strand engaging the road, and with the remaining links presenting their upwardly and downwardly projecting lobes for contact respectively with the tire and the road.

HERBERT C. HEGELHEIMER.